(12) United States Patent
Lankenau et al.

(10) Patent No.: US 9,855,978 B2
(45) Date of Patent: Jan. 2, 2018

(54) COMPONENT CONNECTION

(71) Applicant: Bayerische Motoren Werke Aktiengesellschaft, München (DE)

(72) Inventors: Carsten Lankenau, München (DE); Eva Vietze, München (DE); Johann Van Niekerk, München (DE); Sebastian Zech, München (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 211 days.

(21) Appl. No.: 14/485,091

(22) Filed: Sep. 12, 2014

(65) Prior Publication Data
US 2015/0003899 A1  Jan. 1, 2015

Related U.S. Application Data

(63) Continuation of application No. PCT/EP2013/051572, filed on Jan. 28, 2013.

(30) Foreign Application Priority Data

Mar. 13, 2012 (DE) .......................... 10 2012 203 878

(51) Int. Cl.
*B62D 27/02* (2006.01)
*F16B 5/04* (2006.01)
(Continued)

(52) U.S. Cl.
CPC ............ *B62D 27/026* (2013.01); *B23K 31/02* (2013.01); *B23K 33/008* (2013.01); *B29C 65/58* (2013.01);
(Continued)

(58) Field of Classification Search
CPC ........ F16B 19/002; F16B 19/004; F16B 5/06; F16B 5/065; F16B 5/0657; F16B 5/0664;
(Continued)

(56) References Cited

U.S. PATENT DOCUMENTS 4,012,155 A * 3/1977 Morris ................. F16B 7/0413
24/625
4,373,826 A * 2/1983 Inamoto ................. B60R 19/52
24/297
(Continued)

FOREIGN PATENT DOCUMENTS

CN      1295653 A      5/2001
DE   202 06 683 U1    8/2002
(Continued)

OTHER PUBLICATIONS

Corresponding International Search Report dated Jun. 6, 2013 with English Translation (six (6) pages).
(Continued)

*Primary Examiner* — Daniel Wiley
(74) *Attorney, Agent, or Firm* — Crowell & Moring LLP

(57) ABSTRACT

A component connection is provided. The component connection has a first component, at least a first male fixing element projecting from the first component, and a second component, the second component has at least a female fixing element, into which the male fixing element is fitted. At least the first component consists of a fiber-reinforced plastic material.

13 Claims, 2 Drawing Sheets

(51) Int. Cl.

| | | |
|---|---|---|
| *F16B 5/06* | (2006.01) | |
| *B29C 65/58* | (2006.01) | |
| *B29C 65/60* | (2006.01) | |
| *B29C 65/64* | (2006.01) | |
| *B29C 65/78* | (2006.01) | |
| *B29C 65/00* | (2006.01) | |
| *B23K 31/02* | (2006.01) | |
| *B23K 33/00* | (2006.01) | |
| *F16B 19/02* | (2006.01) | |
| *B29L 31/00* | (2006.01) | |
| *B29L 31/30* | (2006.01) | |
| *B23K 101/18* | (2006.01) | |
| *B23K 103/10* | (2006.01) | |
| *B23K 103/16* | (2006.01) | |
| *B23K 103/18* | (2006.01) | |

(52) U.S. Cl.
CPC ............ *B29C 65/606* (2013.01); *B29C 65/64* (2013.01); *B29C 65/7823* (2013.01); *B29C 66/43* (2013.01); *B29C 66/721* (2013.01); *B29C 66/742* (2013.01); *B62D 27/02* (2013.01); *F16B 5/045* (2013.01); *F16B 5/065* (2013.01); *F16B 5/0664* (2013.01); *B23K 2201/185* (2013.01); *B23K 2203/10* (2013.01); *B23K 2203/16* (2013.01); *B23K 2203/18* (2013.01); *B29C 66/7212* (2013.01); *B29C 66/72141* (2013.01); *B29C 66/7392* (2013.01); *B29C 66/7422* (2013.01); *B29C 66/74283* (2013.01); *B29L 2031/3002* (2013.01); *B29L 2031/737* (2013.01); *F16B 19/02* (2013.01); *Y10T 403/477* (2015.01); *Y10T 403/70* (2015.01); *Y10T 403/7062* (2015.01); *Y10T 403/7075* (2015.01)

(58) Field of Classification Search
CPC ..... F16B 21/008; B62D 27/026; B62D 27/04; B62D 27/06; B60R 13/0206
See application file for complete search history.

(56) References Cited

U.S. PATENT DOCUMENTS

| | | | | |
|---|---|---|---|---|
| 4,393,561 | A * | 7/1983 | Yuda | B60K 11/08 |
| | | | | 24/297 |
| 4,973,212 | A * | 11/1990 | Jacobs | F16B 5/0642 |
| | | | | 24/297 |
| 5,005,265 | A * | 4/1991 | Muller | F16B 21/07 |
| | | | | 24/289 |
| 5,716,161 | A * | 2/1998 | Moore | F16B 5/065 |
| | | | | 24/453 |
| 5,897,278 | A | 4/1999 | Frattarola | |
| 6,283,540 | B1 * | 9/2001 | Siebelink, Jr. | B60J 7/1635 |
| | | | | 296/191 |
| 6,378,931 | B1 * | 4/2002 | Kolluri | B60J 1/10 |
| | | | | 296/146.15 |
| 6,581,252 | B1 * | 6/2003 | Sedlock | F16B 5/065 |
| | | | | 24/297 |
| 6,857,809 | B2 * | 2/2005 | Granata | B60R 13/0206 |
| | | | | 296/214 |
| 7,547,061 | B2 * | 6/2009 | Horimatsu | B60R 13/0206 |
| | | | | 296/187.01 |
| 8,000,094 | B2 * | 8/2011 | Wang | F16M 11/08 |
| | | | | 248/125.7 |
| 8,047,593 | B2 * | 11/2011 | Fuchs | B23K 11/11 |
| | | | | 156/60 |
| 2007/0137004 | A1 | 6/2007 | Baekelandt | |
| 2011/0059290 | A1 | 3/2011 | Gage et al. | |
| 2011/0278892 | A1 | 11/2011 | Kroener et al. | |
| 2013/0036594 | A1 | 2/2013 | Hammer et al. | |

FOREIGN PATENT DOCUMENTS

| | | | | |
|---|---|---|---|---|
| DE | 10252597 A1 * | 6/2004 | ............ | B25B 27/00 |
| DE | 10 2009 002 912 A1 | 6/2010 | | |
| DE | 10 2010 028 322 A1 | 11/2011 | | |
| JP | 2003-78262 A | 3/2003 | | |
| WO | WO 01/90586 A2 | 11/2001 | | |
| WO | WO 2011/134563 A1 | 11/2011 | | |

OTHER PUBLICATIONS

German Search Report dated Nov. 23, 2012 (five (5) pages).
Chinese Office Action issued in counterpart Chinese Application No. 201380004248.9 dated Dec. 24, 2015 with English-language translation (fourteen (14) pages).
Chinese Office Action dated Apr. 16, 2015 (ten (10) pages).
Chinese Office Action issued in counterpart Chinese Application No. 201380004248.9 dated Jun. 29, 2016, with English translation (six (6) pages).
Chinese Office Action issued in counterpart Chinese Application No. 201380004248.9 dated Dec. 20, 2016 with English-language translation (thirteen (13) pages).

* cited by examiner

COMPONENT CONNECTION

CROSS REFERENCE TO RELATED APPLICATIONS

This application is a continuation of PCT International Application No. PCT/EP2013/051572, filed Jan. 28, 2013, which claims priority under 35 U.S.C. §119 from German Patent Application No. 10 2012 203 878.7, filed Mar. 13, 2012, the entire disclosures of which are herein expressly incorporated by reference.

BACKGROUND AND SUMMARY OF THE INVENTION

The present invention relates to a component connection and, in particular, to a component connection of the type known from German Patent Document DE 10 2010 028 322 A1.

In the large-scale production of vehicle bodies, a plurality of individual body parts as well as attachments, such has mountings, etc. are largely assembled in an automated manner. During a joining operation, two or more vehicle body parts are first positioned relative to one another and, subsequently, are mutually connected, for example, by welding, clinching or by other methods. In vehicle construction as well as in a plurality of other applications, the "lightweight construction" issue is playing an increasingly significant role.

It is an object of the invention to create a component connection which is particularly suitable for lightweight construction applications.

This object is achieved by a component connection, having a first component, at least a first male fixing element projecting from the first component, and a second component, which has at least a female fixing element, into which the male fixing element is fitted, wherein at least the first component is formed of a fiber-reinforced plastic material.

A starting point of the invention is a component connection having a first component from which at least a first male "fixing element" projects. The first component may, for example, be a vehicle component, particularly a vehicle body component of a vehicle body to be produced. As an alternative, the first component may also be a "non-vehicle component".

The component connection also has a second component which has at least one "female fixing element" into which the male fixing element is fitted or clamped. The female fixing element may, for example, be formed by a circular hole, an oblong hole, a keyhole-shaped through-hole, a hole in the shape of a polygon or the like. It can be punched out of the second component. Punching edges may be bent over from the second component in a (for example, vertically) projecting manner to provide a "clamping collar" (so-called "collar-type opening").

The second component may, for example, be a vehicle component or a non-vehicle component.

The essence of the invention is the fact that at least one of the two components is a component consisting of a fiber-reinforced plastic material.

Such a component connection is therefore, for example, considered for the production of vehicle bodies, which entirely or partially consist of fiber-reinforced plastic components. In particular, it may be provided that two components consist of different materials ("composite connections"). For example, the first component may be a fiber-reinforced plastic component (particularly a carbon-fiber-reinforced plastic component), and the second component may be a metal component, for example a steel or aluminum component. The first component may particularly be produced by the so-called "wet-pressing method".

According to a further development of the invention, it is provided that the two components are mutually connected by way of one or more such component connections. It may be provided that the at least one above-described component connection is used for prefixing the two components or is used for that purpose in a targeted manner. The fixing elements permit a prefixing of the two components, which has the advantage that the latter can be transported or moved as an assembly immediately after the fitting-together of the fixing elements, without any change of their relative position.

In other words, by way of the above-described component connection, the two components are placed in a predefined position relative to one another and are durably fixedly connected after the "fitting-together" of the fixing elements, for example by a gluing, screwing, welding, riveting together (particularly by blind riveting) or by other connecting methods. In the case of component connections, in which one or both components consist of a fiber-reinforced plastic material, particularly a gluing-together of the components is taken into consideration.

According to a further development of the invention, it is provided that the two components are clamped to one another by way of the two fixing elements and are therefore held together at least by a certain "prefixing force". When the components are subsequently durably fixedly connected with one another, for example, by means of gluing-together, the components do not necessarily have to be additionally clamped together by use of tensioning or clamping devices. When the fixing elements have a corresponding design, the clamping force applied by the fixing elements may be sufficient for sufficiently firmly holding together the two components during the hardening phase of the adhesive. A component connection according to the invention therefore permits an elimination of separate tensioning or clamping devices. On the one hand, this results in immediate cost advantages.

A further advantage is the fact that the two components are freely accessible in their connection area, i.e. in the area where they are glued together. The free accessibility facilitates the use of heating devices (for example, infrared radiators) which, under certain circumstances, may be needed for a faster hardening of the adhesive.

According to a further development of the invention, it is provided that the male fixing element consists completely or at least partly of a thermoplastic material. Thermoplastic materials can be easily processed in a cost-effective manner. The most varied shapes can thereby be produced by injection molding. Thermoplastic materials do not corrode and permit a "galvanic separation" with respect to other materials.

The male fixing element can be connected in one piece with a "basic element". The basic element may consist of the same material as the male fixing element. The basic element may have a plate-shaped design, for example, as a circular, rectangular, square, triangular plate, etc. As an alternative, the basic element may also have a curved shape.

In order to achieve a connection with the first component that is as good and firm as possible, the basic element may be "embedded" in the first component. "Embedded" means that the basic element is entirely or at least partly received within the first component. Preferably, the basic element is embedded in the first component with its underside facing the first component and with its entire surrounding edge or at least with a section or a certain partial height of the edge.

A top side of the basic element facing away from the first component may, but does not necessarily have to be, embedded in the first component. It can rather be provided that the top side of the basic element, from which the male fixing element projects, is essentially at one level with a top side of the first component (i.e., is flush with it) or smoothly or essentially smoothly transitions into a top side of the first component. In particular, the top side of the basic element may also have a curved design if the adjoining side of the first component has a corresponding curvature.

As mentioned above, the male fixing element projecting from the first component is fitted or clamped into the female fixing element provided in the second component. In order to achieve a specified minimum distance between the two components in the area of the fixing elements, it may be provided that at least one elevation acting as a spacer for the second component is provided on a top side of the basic element. Such a "minimum distance" is useful particularly when the two components are to be glued to one another in order to ensure that a sufficient amount of adhesive remains between the two components when they are clamped together by way of the fixing elements. Without such a fixing element, there would be the danger that, in the event of an excessive clamping force, too much adhesive is pressed out of the gap situated between the two components, which would have an unfavorable effect on the stability of the components to be glued to one another.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
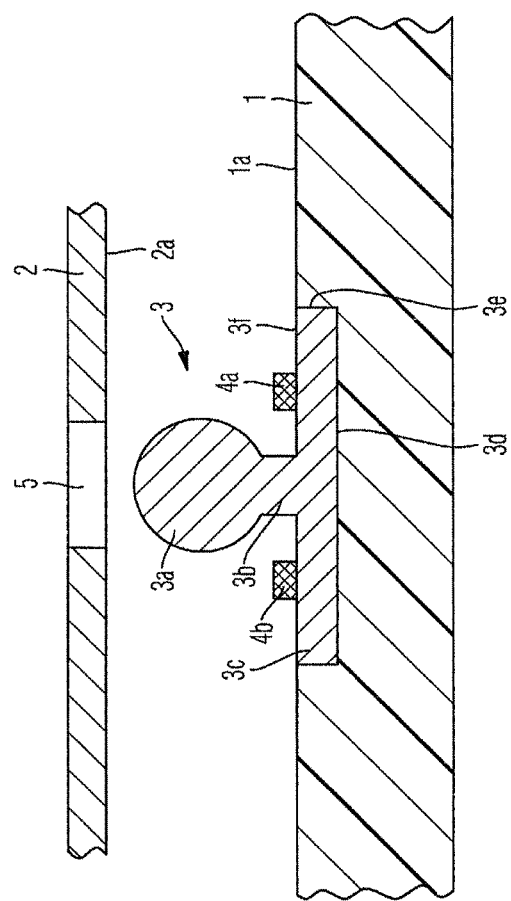
FIG. 1 is a cross-sectional view of a first embodiment with a spherical male fixing element.

FIG. 1 illustrates two components 1, 2 before they are connected. The first component 1 is a component produced of a fiber-reinforced plastic material. In the component 1, for example, carbon fibers, glass fibers or fibers of other materials may be arranged in a distributed manner, which reinforces the component 1. The fibers may, for example, be present in a finely distributed fashion or in a textile structure, for example, in the form of a fabric, knit, laying, woven, or the like. Such fiber-reinforced plastic components are produced in an injection molding die or in a transfer mold. First, the fiber-type material, for example, in the form of a so-called "preform" is placed in the injection molding die. Subsequently, a liquid synthetic material, for example, a synthetic resin, is injected into the injection molding die and hardened.

The component 1 illustrated in FIG. 1 is distinguished by the fact that, in the area of a top side 1a, a male fixing element 3 is "embedded" in the fiber-reinforced plastic component 1. The male fixing element 3 has a spherical head, a spheroidal head, or a sphere-shaped or sphere-type head 3a, which is connected by way of a pin-type connection section 3b with a plate-shaped base element 3c. The head 3a, the connection section 3b and the basic element 3c are here connected to one another in one piece. They may be made of the same material, such as a thermoplastic material.

As illustrated in FIG. 1, the male fixing element 3 is embedded with an underside side 3d and a surrounding edge 3e in the fiber-reinforced plastic component 1. A top side 3f of the basic element 3c facing away from the fiber-reinforced plastic component 1 transitions here essentially "smoothly" into the top side 1a of the fiber-reinforced plastic component 1.

As illustrated in FIG. 1, two elevations 4a, 4b acting as spacers project from the top side 3f of the basic element 3c. Instead of two elevations, a ring-type surrounding spacer element may be provided.

The second component 2 illustrated in FIG. 1 has a "female fixing element" formed by a through-hole 5. The through-hole 5 is dimensioned such that the male fixing element or its head 3a can be fitted through the through-hole 5, in which case, during the insertion of the head 3a into the through-hole 5, the head 3a and/or the through-hole 5 are elastically deformed to a certain extent. After the pushing of the head 3a through the through-hole 5, an underside 2a of the second component 2 will be situated on top sides of the spacers 4a, 4b, whereby a defined distance is ensured between the two components 1, 2. As a result of the elasticity of the head 3a and of the through-hole 5, the two components 1, 2 are clamped together by the two fixing elements 3, 5 and are additionally form-fittingly held on one another.

After the clamping-together of the two components 1, 2, these can be durably connected with one another, for example, by welding, riveting, screwing, etc. However, in particular or in addition, the two components 1, 2 can additionally be glued to one another, in which case, it is ensured by use of the spacers 4a, 4b that an adhesive applied to the top side 1a or an adhesive placed in the space between the two components 1, 2 can remain there and will not be largely pressed out by the action of the fixing elements 3, 5.

Figure 2:
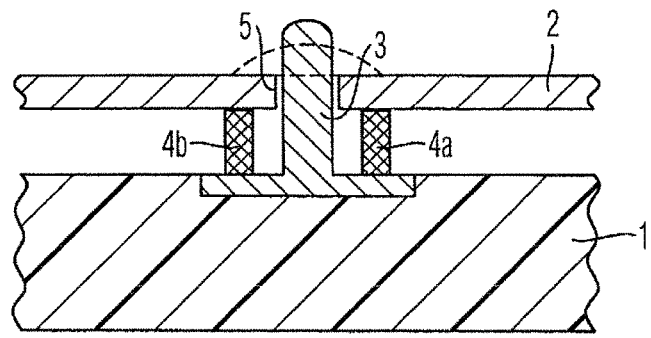
FIG. 2 is a cross-sectional view of an embodiment with a pin-type male fixing element with a head that was plastically deformed.

FIG. 2 illustrates an embodiment, in which the male fixing element 3 has the shape of a pin or peg. After the pushing of the male fixing element 3 through the through-hole 5 provided in the second component 2, the free end of the peg 3 protruding from the through-hole 5 can be plastically deformed, for example, by warming or heating the free end of the pin 3 and/or by a mechanical shaping of the latter.

Figure 3:
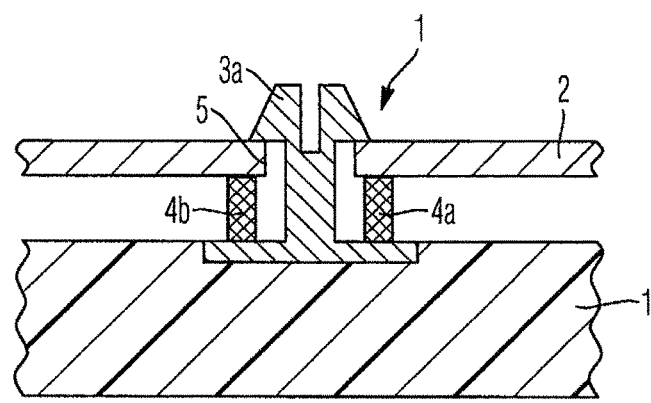
FIG. 3 is a cross-sectional view of an embodiment with a male fixing element having an elastic head.

FIG. 3 shows an embodiment in which the male fixing element 3 has an elastic head section 3a, which, with respect to its shape, can be compared with the shape of a head of a slotted screw. The head 3a is so elastic that it can be pressed through the slightly smaller-dimensioned through-hole 5, which is provided in the second component 2, whereby the head 3a is elastically deformed during the pressing-through. After the pressing-through of the head 3a, the latter will expand again and, as illustrated in FIG. 3, will form-fittingly reach over the through-hole 5, whereby the two components 1, 2 are held together.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
   a first component comprising at least a male fixing element projecting from the first component, the male fixing element comprising:
   a base element embedded in the first component,
   a pin element extending from the base element,
   a head-type element at an end of the pin element opposite the base element, and
   at least one elevation extending from the base element and disposed radially outward of the pin element; and
   a second component, comprising at least a female fixing element, into which the male fixing element is fitted,
   wherein at least one of the first and second components is a vehicle body component, and
   wherein the at least one elevation is sized so that when the head-type element and pin element are inserted through the female fixing element, the at least one elevation is brought into abutment against a first surface of the second component, and the head-type element is brought into abutment against only a second surface of the second component, the second surface facing in the opposite direction of the first surface.

2. The component connection according to claim 1, wherein
   the first and second components are clamped to one another by way of the male and female fixing elements.

3. The component connection according to claim 2, wherein
   the male fixing element is formed of a plastic material.

4. The component connection according to claim 3, wherein a plastic material of the male fixing element is different than the plastic material of the first component.

5. The component connection according to claim 3, wherein the male fixing element is formed at least partially of a thermoplastic material.

6. The component connection according to claim 1, wherein the head-type element and the base element are formed of the same material.

7. The component connection according to claim 6, wherein a top side of the base element, from which the pin element projects, is substantially at a level with a top side of the first component or transitions smoothly into a top side of the first component.

8. The component connection according to claim 6, wherein
   the at least one elevation is provided on a top side of the base element.

9. The component connection according to claim 1, wherein the base element has a plate shape.

10. The component connection according to claim 1, wherein
    the first and second components are glued to one another.

11. The component connection according to claim 1, wherein
    the first and second components are riveted to one another.

12. The component connection according to claim 1, wherein the head-type element comprises an elastic head-type element, which form-fittingly reaches over the female fixing element.

13. The component connection according to claim 1, wherein the female fixing element is formed by a circular hole, by an oblong hole, a collar opening or a keyhole-type opening.

* * * * *